(12) United States Patent
Smalley et al.

(10) Patent No.: US 11,099,044 B1
(45) Date of Patent: Aug. 24, 2021

(54) DOSING TIMER AND DISPENSERS USING THE SAME

(71) Applicant: Silgan Dispensing Systems Corporation, Grandview, MO (US)

(72) Inventors: Leah Smalley, Grandview, MO (US); Brian Van Houten, Grandview, MO (US)

(73) Assignee: Silgan Dispensing Systems Corporation, Grandview, MO (US)

( * ) Notice: Subject to any disclaimer, the term of this patent is extended or adjusted under 35 U.S.C. 154(b) by 0 days.

(21) Appl. No.: 16/886,859

(22) Filed: May 29, 2020

(51) Int. Cl.
*G01F 11/26* (2006.01)

(52) U.S. Cl.
CPC .................. *G01F 11/265* (2013.01)

(58) Field of Classification Search
CPC .................................................. G01F 11/265
USPC ............................................................. 222/71
See application file for complete search history.

(56) References Cited

U.S. PATENT DOCUMENTS

| | | | | |
|---|---|---|---|---|
| 68,532 A | * | 9/1867 | Rooney | B65D 47/40 222/109 |
| 745,744 A | * | 12/1903 | Uhalt | G01F 23/02 73/325 |
| 1,621,252 A | * | 3/1927 | Hillyard | A47G 19/12 222/463 |
| 2,099,629 A | * | 11/1937 | Schaetzel | B65D 39/06 222/500 |
| 2,714,977 A | * | 8/1955 | Davis | B65D 47/06 222/424.5 |
| 3,049,922 A | * | 8/1962 | Schwaneke | A47J 31/4457 73/323 |
| 3,103,099 A | * | 9/1963 | Hanks | G04F 1/06 368/93 |
| 3,598,284 A | * | 8/1971 | Wessely | B67D 3/00 222/18 |
| 3,647,115 A | * | 3/1972 | McCann | G01F 11/025 222/39 |
| 3,822,544 A | * | 7/1974 | Groves | G04F 1/06 368/65 |
| 3,920,149 A | * | 11/1975 | Fortino | G06Q 20/342 222/1 |
| 3,968,688 A | * | 7/1976 | Eaton | G01F 23/02 73/328 |
| 4,054,026 A | * | 10/1977 | Goodrich | G04F 1/08 368/93 |
| 4,115,997 A | * | 9/1978 | Rogovin | G04B 47/00 368/13 |
| 4,117,666 A | * | 10/1978 | Aguilar | G04F 1/06 368/91 |
| 4,353,489 A | * | 10/1982 | Arnold | B65D 47/127 222/570 |
| 4,550,862 A | * | 11/1985 | Barker | B65D 41/26 222/109 |
| 4,666,065 A | * | 5/1987 | Ohren | G01F 11/262 222/109 |

(Continued)

*Primary Examiner* — Paul R Durand
*Assistant Examiner* — Michael J. Melaragno
(74) *Attorney, Agent, or Firm* — Barlow Josephs and Holmes Ltd; Stephen Holmes

(57) ABSTRACT

A dispensing system includes a pour cap for a container and a timing device configured to visually indicate when a dose has been dispensed from the dispensing system, the timing device being securable to either the pour cap or the container and configurable based on a product being dispensed.

20 Claims, 6 Drawing Sheets

(56) References Cited

U.S. PATENT DOCUMENTS

| | | | | |
|---|---|---|---|---|
| 4,741,459 A * | 5/1988 | Silvenis | B65D 41/26 |
| | | | 141/381 |
| 4,836,415 A * | 6/1989 | Grussmark | G04F 1/06 |
| | | | 206/216 |
| 5,031,804 A * | 7/1991 | Conrad | B65D 25/48 |
| | | | 222/566 |
| 5,058,772 A * | 10/1991 | Moore | B65D 47/40 |
| | | | 222/109 |
| 5,392,947 A * | 2/1995 | Gentile | A61K 8/19 |
| | | | 215/6 |
| 5,457,665 A * | 10/1995 | Reid | G04F 1/08 |
| | | | 368/93 |
| 5,462,202 A * | 10/1995 | Haffner | B65D 47/06 |
| | | | 222/109 |
| 5,505,349 A * | 4/1996 | Peckels | B67D 3/0041 |
| | | | 222/36 |
| 5,507,411 A * | 4/1996 | Peckels | B67D 3/0041 |
| | | | 222/1 |
| 5,566,862 A * | 10/1996 | Haffner | B65D 47/06 |
| | | | 222/109 |
| 5,855,299 A * | 1/1999 | Arnold | B65D 47/122 |
| | | | 222/109 |
| 5,941,422 A * | 8/1999 | Struble | B29C 66/8322 |
| | | | 222/109 |
| 6,036,055 A * | 3/2000 | Mogadam | B67D 3/0006 |
| | | | 222/23 |
| 6,301,961 B1 * | 10/2001 | Rolfes | A47J 41/0094 |
| | | | 220/592.2 |
| 6,409,046 B1 * | 6/2002 | Peckels | B67D 3/0041 |
| | | | 222/1 |
| 6,505,752 B1 * | 1/2003 | Rolfes | A47J 41/0016 |
| | | | 215/13.1 |
| 6,926,179 B2 * | 8/2005 | Wagner, III | B65D 47/0842 |
| | | | 222/481.5 |
| 7,163,125 B2 * | 1/2007 | Murakami | B67D 1/0425 |
| | | | 215/230 |
| 7,306,121 B2 * | 12/2007 | Ophardt | B65D 47/065 |
| | | | 222/209 |
| 7,845,524 B2 * | 12/2010 | Evans | G01F 11/26 |
| | | | 222/454 |
| 8,511,492 B2 * | 8/2013 | Webster | B65D 47/0833 |
| | | | 215/309 |
| 9,428,374 B2 * | 8/2016 | Houck | B67D 3/0077 |
| 9,717,373 B2 * | 8/2017 | Andrews | B65D 35/56 |
| 9,718,665 B2 * | 8/2017 | Wittrup | B67D 3/0051 |
| 10,327,599 B2 * | 6/2019 | Smith | B65D 47/043 |
| 10,336,514 B1 * | 7/2019 | Briggs | B65D 41/26 |
| 10,351,319 B1 * | 7/2019 | Mizer | B65D 47/40 |
| 2005/0103803 A1 * | 5/2005 | Hung | B65D 47/40 |
| | | | 222/109 |
| 2006/0091152 A1 * | 5/2006 | Evans | G01F 11/262 |
| | | | 222/1 |
| 2006/0091153 A1 * | 5/2006 | Evans | G01F 11/262 |
| | | | 222/1 |
| 2006/0131330 A1 * | 6/2006 | Stebick | B65D 47/40 |
| | | | 222/109 |
| 2007/0029352 A1 * | 2/2007 | Norris | B65D 47/2031 |
| | | | 222/494 |
| 2007/0194047 A1 * | 8/2007 | Tauber | B65D 47/122 |
| | | | 222/109 |
| 2009/0045224 A1 * | 2/2009 | Faaborg | B65D 47/06 |
| | | | 222/111 |
| 2010/0116776 A1 * | 5/2010 | Szekely | B65D 47/125 |
| | | | 215/329 |
| 2010/0213211 A1 * | 8/2010 | Whaling | B65D 47/12 |
| | | | 222/111 |
| 2011/0297698 A1 * | 12/2011 | Chiang | B65D 47/08 |
| | | | 222/109 |
| 2012/0043295 A1 * | 2/2012 | Webster | B65D 47/0833 |
| | | | 215/44 |
| 2013/0008919 A1 * | 1/2013 | Honan | B65D 25/42 |
| | | | 222/23 |
| 2013/0334246 A1 * | 12/2013 | Houck | G01F 13/006 |
| | | | 222/23 |
| 2014/0252034 A1 * | 9/2014 | Brannon | B65D 47/0828 |
| | | | 222/111 |
| 2014/0346198 A1 * | 11/2014 | Bond | G01F 11/265 |
| | | | 222/641 |
| 2015/0251822 A1 * | 9/2015 | Slevin | B65D 47/06 |
| | | | 222/570 |
| 2015/0298875 A1 * | 10/2015 | Dagnelie | B65D 47/32 |
| | | | 222/465.1 |
| 2017/0073115 A1 * | 3/2017 | Crawford | B65D 25/2885 |
| 2018/0310778 A1 * | 11/2018 | Smith | G01F 11/262 |
| 2019/0071299 A1 * | 3/2019 | Briggs | G01F 11/006 |
| 2020/0025599 A1 * | 1/2020 | Koster | B65D 51/2807 |

* cited by examiner

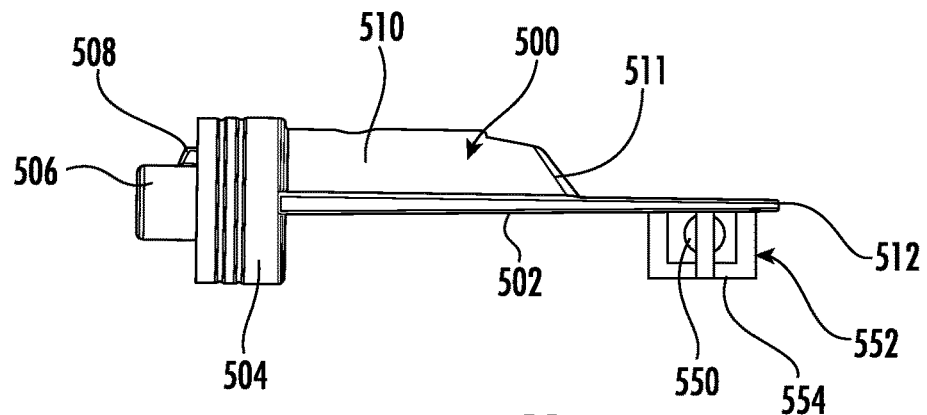
FIG. 11
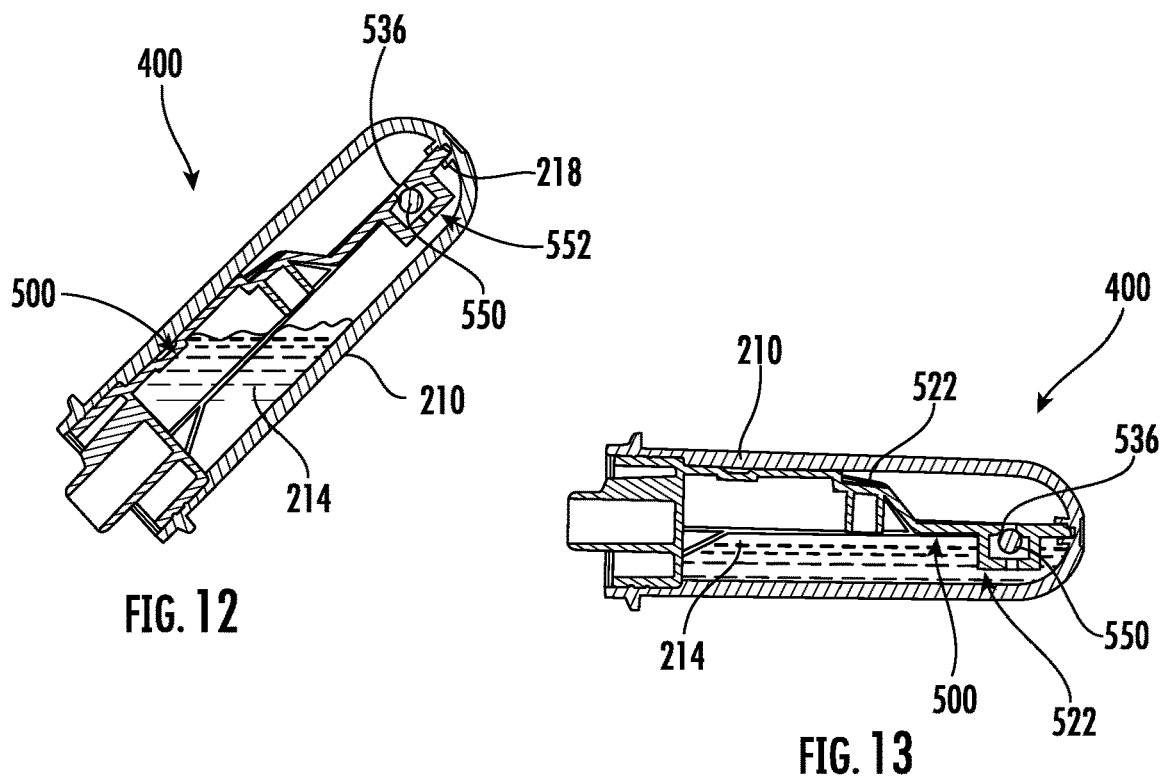
FIG. 12
FIG. 13
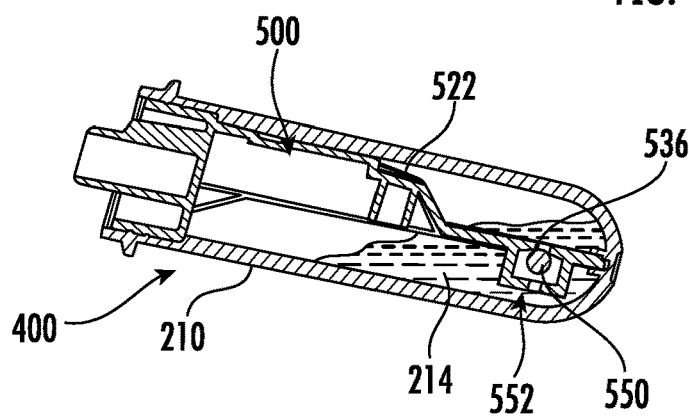
FIG. 14

DOSING TIMER AND DISPENSERS USING THE SAME

BACKGROUND OF THE INVENTION

Field of the Invention: The present invention relates to dispensing systems and more particularly to dispenser devices having a timer feature allowing a user to estimate the dispense rate or dosing volume of the dispenser device.

State of the Art: Dispensing devices are used to dispense a various number of products. Typically, a dispensing device—such as a pump, closure, trigger sprayer, or other device—is attached to a container or bottle containing a product to be dispensed. The dispensing device facilitates the dispensing of the product from the container or bottle.

In many instances, a user desires to measure the amount of product being dispensed from a container through the dispensing device. For example, in many laundry care applications, a dispensing device may include a cap that acts as a cup, having graduated markings in the cap so that a user may measure out a desired amount of product into the cap before pouring the product into an intended location. While such systems allow estimated measurements, many users complain about the additional mess associated with using the cap in such a manner and prefer a one-handed operation allowing them to pour or dispense a product directly into the desired location.

BRIEF SUMMARY OF THE INVENTION

According to certain embodiments of the invention, a dispensing device may include a pour cap having a timing device integrated therewith or integrated with the bottle or container. A timing device may include a transparent or translucent outer cylinder which may be filled with a fluid or other product that may flow within the timing device to visually represent or correspond to a given amount of product being dispensed from the dispensing device. The timing device may include flow channels and/or flow restrictors which may be modified for a particular use such that the visible flow of the fluid or flowable material in the timing device may be used to measure the output of the dispensing device.

A timing device according to various embodiments of the invention may be integrated with a cap, assembled to the cap or integrated with the bottle or assembled to the bottle or handle. The timing device may be positioned near the handle so that a user may visually monitor the timing device during operation. Fluid flowing into, or out of, the timing device may indicate when a dose has been dispensed from the dispensing device.

BRIEF DESCRIPTION OF THE DRAWINGS

While the specification concludes with claims particularly pointing out and distinctly claiming particular embodiments of the present invention, various embodiments of the invention can be more readily understood and appreciated by one of ordinary skill in the art from the following descriptions of various embodiments of the invention when read in conjunction with the accompanying drawings in which:

FIG. 11 illustrates another exemplary flow regulator according to various embodiments of the present invention;

FIG. 12 illustrates a cross-sectional view of a timing device including the flow regulator of FIG. 11;

FIGS. 13-15 illustrate exemplary pouring and timing scenarios showing movement of the check ball and flow of the timing fluid within the timing device.

DETAILED DESCRIPTION OF THE INVENTION

Figure 1:
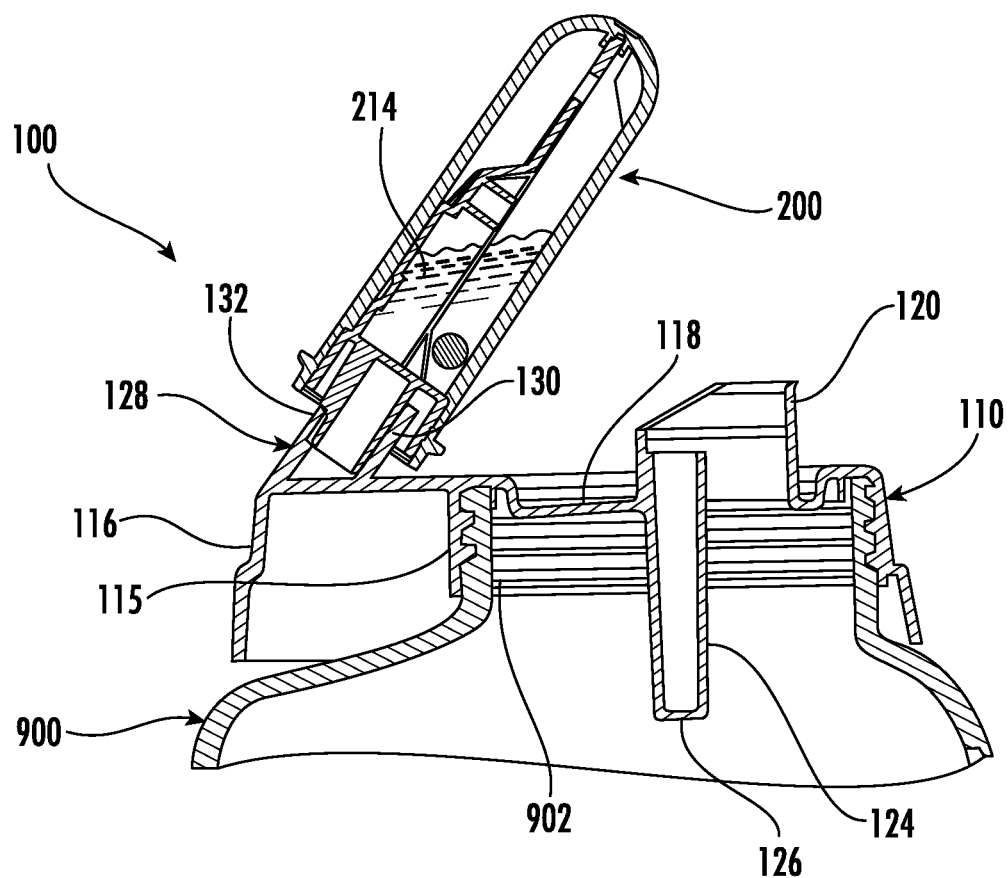
FIG. 1 illustrates a cross-sectional view of an exemplary dispensing system according to various embodiments of the invention.

An exemplary dispensing system 100 according to various embodiments of the invention is illustrated in FIGS. 1-10. A dispensing system 100 may include a container 900 and a pour cap 110. The pour cap 110 or container 900 may include a timing device 200 incorporated therein wherein the timing device is at least partially visible during use of the dispensing system 100.

According to various embodiments of the invention, a pour cap 110 may include a cap base 116 which may be connected to or mated with a container 900. For instance, the cap base 116 may include an inner skirt 115 including threads, bayonet features, snap features, or other features allowing the pour cap 110 to be connected to an opening or neck 902 of a container 900 having similar features. The exemplary pour cap 110 and container neck 902 include mating threads, but this should not be considered limiting to the disclosure. A closure or cap (not shown) may be connected to the cap base 116 by a living hinge, snap retention system or other such retention system.

The cap base 116 includes a main deck 118 and a dispensing spout 120 extending upwardly therefrom. A venting tube 124 may be located within the dispensing spout 120 or elsewhere on the main deck 118. The venting tube 124 may in some embodiments be located adjacent the rear portion of the dispensing spout 120 opening and extends downwardly from the main deck 118 into the interior of the cap base 116. In other embodiments, the venting tube 124 may be located at other locations depending on the configuration of the cap base 116 and the size and orientation of the dispensing spout 120. A venting orifice 126 is located at the bottom terminal end of the venting tube 124. The venting orifice 126 may be provided by integrally molding the orifice or may be provided by a separate cap fitted over the terminal end of the venting tube 124. The upper end of the venting tube 124 is preferably disposed below the undercut of the spout lip. The length of the venting tube 124 and the size of the venting orifice 126 may be adjusted to determine the venting performance of the dispensing system based on liquids with different viscosities.

As illustrated in FIG. 1, a timing device 200 may be seated externally at a rear portion of the cape base 116. In some embodiments of the invention, the cap base 116 may include a recess into which a timing device 200 may be removably seated, or may include a mounting structure 128 onto which the timing device 200 is secured or held in place.

The timing device 200 may be advantageously located on the pour cap 110, adjacent to the dispensing spout 120, or otherwise supported at an angle, partially above the dispensing spout 120 so that the timing device 200 is easily visible to a user during operation or use of the dispensing system 100. In the exemplary embodiment, the timing device 200 is mounted at a 55° angle slightly above and behind the dispensing spout 120. In other embodiments, the timing device may be mounted at an angle ranging from 40° to 70°.

Figure 2:
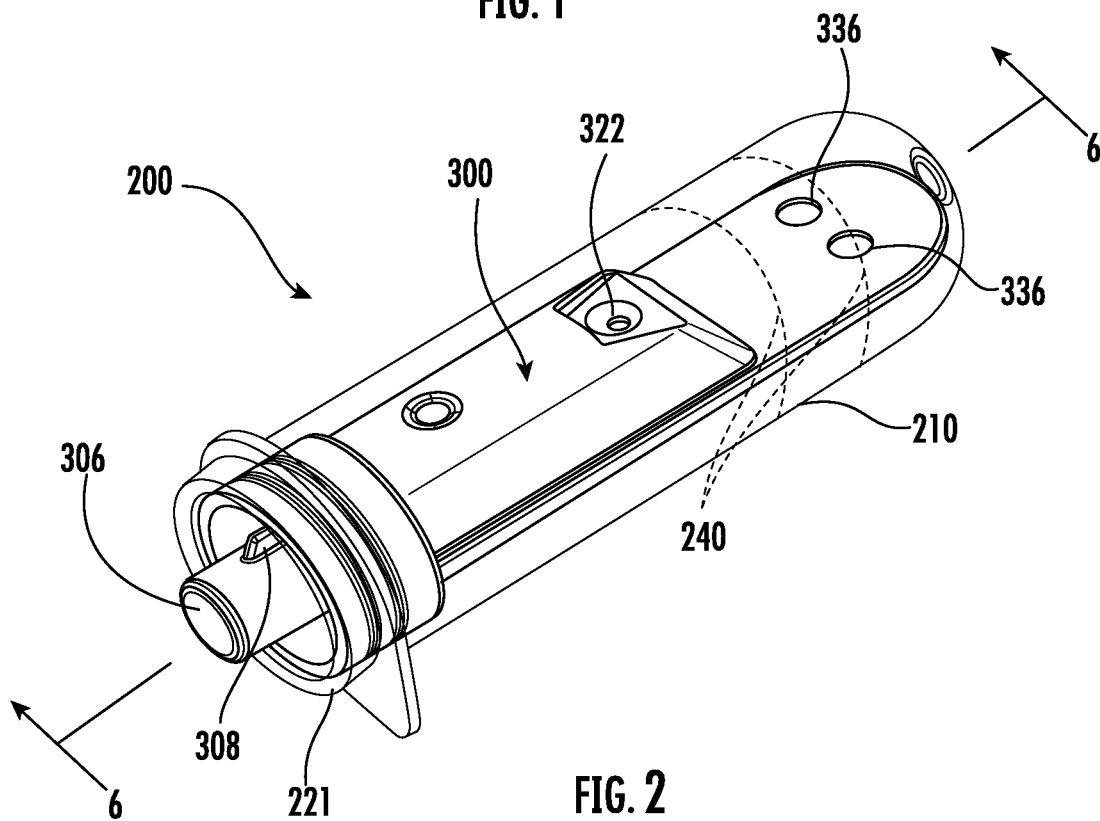
FIG. 2 illustrates a perspective view of an exemplary timing device of various embodiments of the invention.
Figure 3:
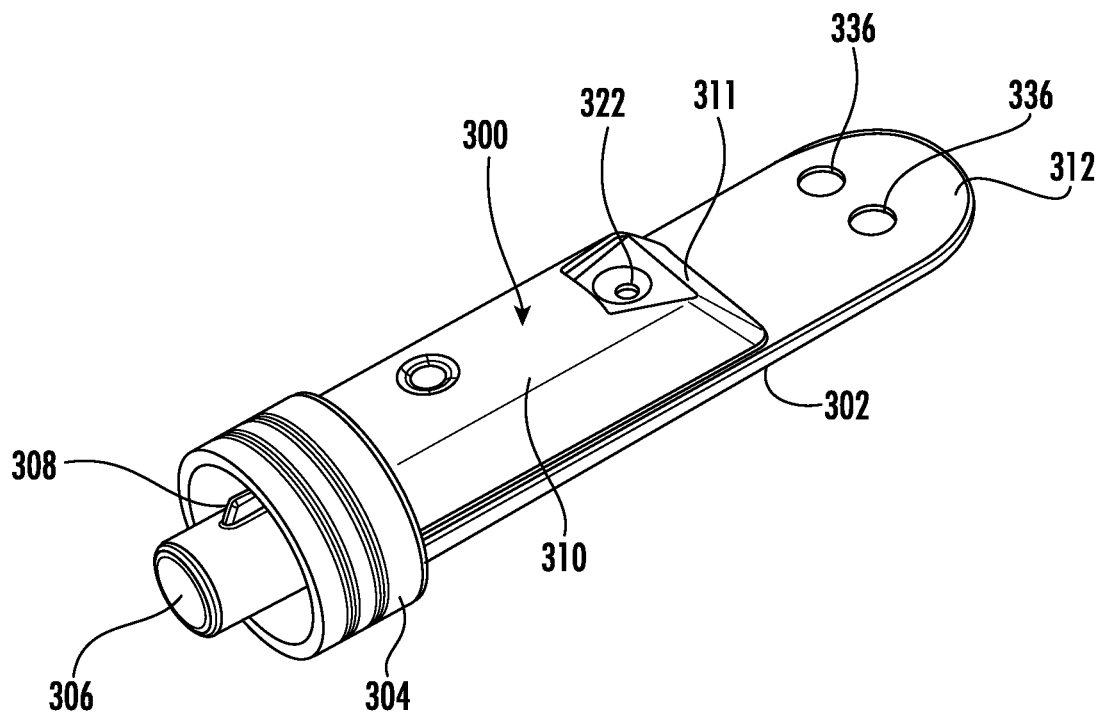
FIG. 3 illustrates a top perspective view of an exemplary flow regulator of various embodiments of the invention.
Figure 4:
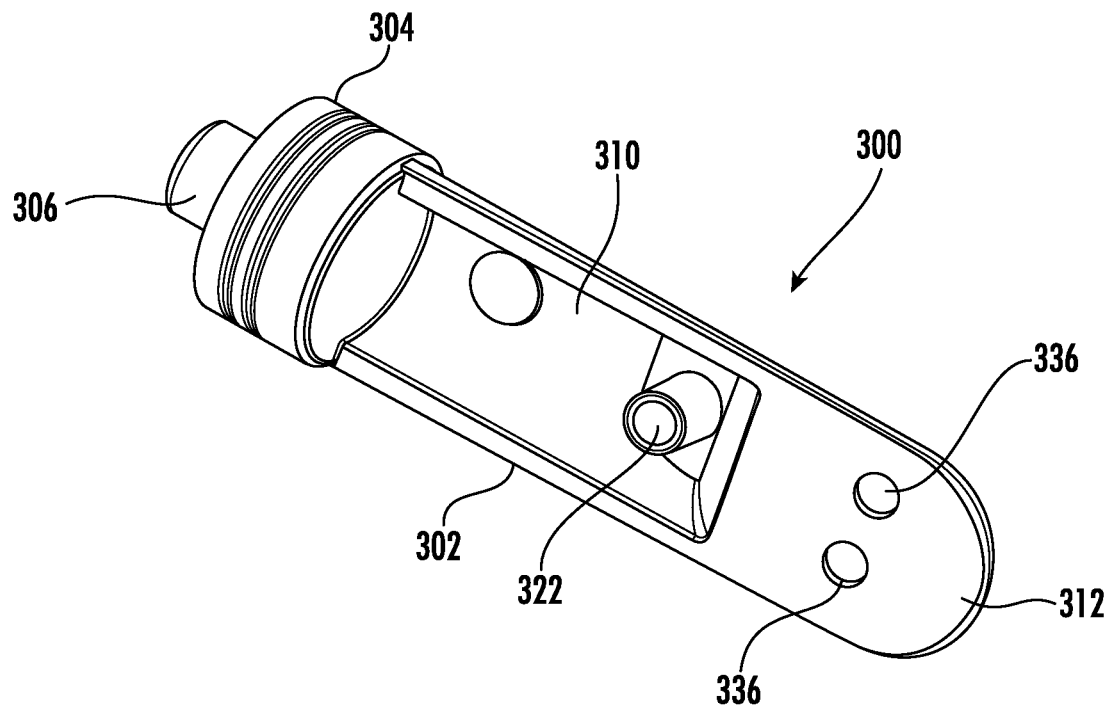
FIG. 4 illustrates a bottom perspective view thereof.
Figure 5:
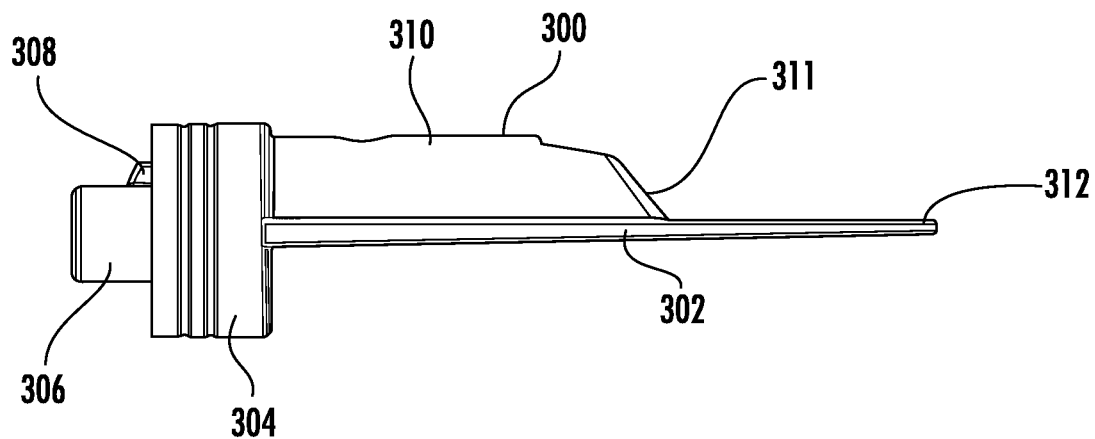
FIG. 5 illustrates a side view thereof.

An exemplary timing device 200 according to various embodiments is illustrated in FIGS. 2-10. As illustrated in FIG. 2, a timing device 200 may include a transparent or translucent outer cylinder 210 having an open end 221 and a hollow space defined by the outer cylinder 210, a flow regulator 300 received within the outer cylinder 210 and a flowable material 214, such as a colored fluid received within the outer cylinder 210. In some embodiments, the flowable material 214 may comprise a flowable liquid silicone material. Flow regulator 300 includes a generally planar, elongate main body portion 302 and an end cap portion 304. Flow regulator 300 may be inserted in an open end 221 of the outer cylinder 210 where the end cap portion 304 may seal, or close, the end of the outer cylinder 210 into which it is placed. The outer surface of the end cap portion 304 and the inner surface of the outer cylinder 210 may include complementary sealing ribs to prevent leakage and maintain the end cap 304 assembled with the outer cylinder 210. The end cap portion 304 may include a central post 306 and an associated orientation fin 308 extending radially outward from the post 306. More particularly, the orientation fin 308 may be oriented perpendicular to the plane of the main body portion 302, the purpose of which will become more apparent hereinbelow. When assembled with the mounting structure 128 on the cap base 116, the post 306 fits within a corresponding annular wall 130 while the orientation fin 308 is received within a corresponding slot 132 in the wall 130. This arrangement maintains a proper rotational alignment of the timing device 200 relative to the pour cap 110. The outer cylinder 210 or end cap 304 may also include a retention structure adjacent the open end 221 of the cylinder 210 which may be snap received with a corresponding structure formed on the cap base 116 to more securely maintain the timing device 200 assembled with the cap base 116.

Referring to FIGS. 2-6, the upper portion of the main body 302 of flow regulator 300 may include an upwardly extending curved wall 310 forming a cavity therebeneath. A terminal end portion 312 of the main body 302 is received into a slot 218 at the closed bottom end of the outer cylinder 210 to maintain positioning therein.

Positioning of flow regulator 300 within the outer cylinder 210 may define a timing reservoir 328 and a storage reservoir 330 separated by the main body portion 302 of the flow regulator 300 and defined by the resting angle of the timing device 200. The terminal end portion 312 of the main body 302 defines the timing reservoir 328 in the smaller area above the main body 302 while the storage reservoir 330 is below the main body 302. In the exemplary embodiment, the timing device 200 is configured and oriented so that the timing fluid 214 normally resides in the storage reservoir 330 in a resting condition and fills the timing reservoir 328 during a dispensing cycle. Marking or indicator lines 240 may be provided in association with the timing reservoir 328. In this regard some embodiments may include one or more indicator markings 240 on the outer cylinder while other embodiments may provide the markings on the upper surface of the flow regulator. When the consumer tilts the bottle 900 and the attached timing device 200, the fluid 214 in the timer transfers by gravity from the storage reservoir 330 to the timing reservoir 328 passing the indicator lines 240, which may, for example, be labeled as S, M and L designating "small", "medium" and "large" doses. As the timing fluid meniscus passes the lines 240, this indicates to the consumer that they have dosed a small medium or large amount of product from the pour spout 120.

Flow regulator 300 may include a return flow opening 322 extending from the timing reservoir 328 into the storage reservoir 328. The return flow opening 322 is preferably located on the curved wall 310. As can be seen in FIG. 1, the mounting angle of the timing device 200 at a resting position allows the timing fluid 214 to collect in the storage reservoir 330 below the main body portion 302. In this static resting position, the timing fluid 214 is not visible to the user. In some embodiments, the timing device 200 may further comprise an opaque sleeve (not shown) or other covering or shroud surrounding the area of the storage reservoir 330. The opaque sleeve may shroud the storage reservoir 330 to provide a more aesthetically pleasing presentation of the timing sequence where the user will only see the timing fluid 214 filling the timing reservoir 328.

A pair of fluid supply openings 336 are defined in the flow regulator 200 adjacent the terminal end of the main body 302. The supply openings 336 have a fluid entrance on the lower surface of the main body 302 and an exit on the upper surface leading into the timing reservoir 328. One can appreciate that as the container 900 is tipped toward horizontal and beyond (see FIGS. 7-10), fluid in the storage reservoir 330 will flow towards the terminal end of the main body portion 302 and may flow through the two supply openings 336 into the timing reservoir 328. Based on the viscosity of the timing fluid 214, the size of the openings 336, and the actual pouring angle, the timing fluid 214 will flow through the openings 336 and gradually fill the timing reservoir 328.

In this regard the, pouring angle of the container 900, the amount of product currently in the container 900, the angle of timing device 200, and the size of the openings 336 all cooperate to coordinate simultaneous flow of the product from the spout 120 with flow of the fluid 214 in the timing device 200 and to thereby create a defined measurement of product flow from the container 900 correlated with filing of the timing reservoir 328, or partial filling of the timing reservoir 328, at the marked indications 240 on the outer cylinder 210.

One issue that has been identified is a difference in the dispensed product based on the amount of product left in the container 900. When the container 900 is full and tipped for dispensing, the product has a higher head pressure and thus flow faster. As product is dispensed, the head pressure with each further dispensing cycle lessens and the product flows more slowly. Since the timing device has a fixed amount of timing fluid, the timing cycle is fairly consistent in the amount of time it takes to fill the timing reservoir 328 during a dispensing cycle. The noted difference in product head pressure thus reduces the amount of product dispensed with each cycle, i.e. same timing but less product dispensed because of less head pressure. In order to provide a more consistent product dispensing volume regardless of container volume, the timing device 200 may further include a variable flow restrictor, which in the exemplary embodiment comprises a check ball 350 within the storage reservoir and an angled ramp 352 within the storage reservoir 330 adjacent the fluid supply holes 336. The ramp 352 may be formed as part of the internal wall of the outer cylinder 210.

The check ball 350 is sized proportionally to the fluid supply holes 336, i.e. slightly larger so that the ball 350 may seat itself into one of the supply holes 336 when the timing device 200 is fully tipped. Additionally, the check ball 350 may be smaller in diameter than the height of the storage reservoir 330 so that the check ball 350 may rest on the bottom of the storage reservoir 330 adjacent the supply openings 336, creating some flow restriction and slowing the flow of timing fluid 214 into the timing reservoir 328 when only partially tipped past horizontal but not fully seated within one of the openings 336. When fully tipped, the check ball rides up the ramp 352 to seat itself in one of the openings 336, partially blocking fluid flow into the timing reservoir 328 (one hole 336 remains open) and thus slowing the filling of the timing reservoir 328 and extending to pouring cycle.

Figure 7:
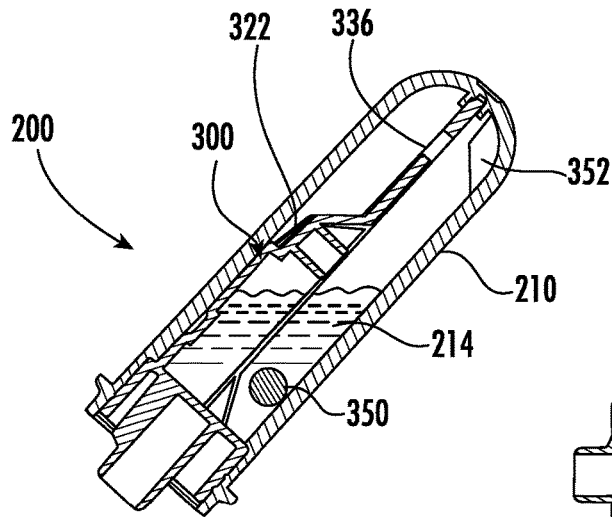
FIGS. 7-10 illustrate exemplary pouring and timing scenarios showing movement of the check ball and flow of the timing fluid within the timing device.
Figure 8:
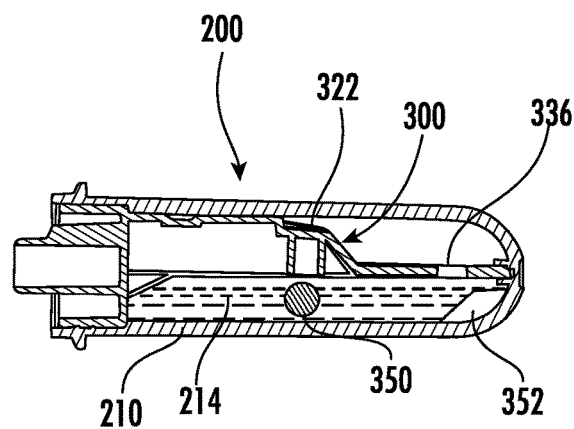
Figure 9:
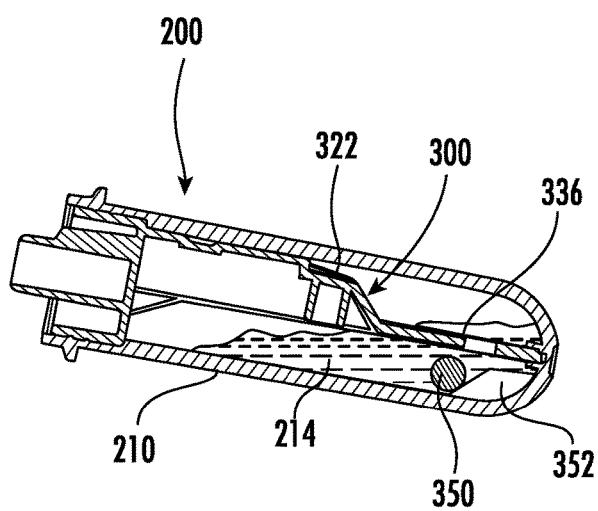
Figure 10:
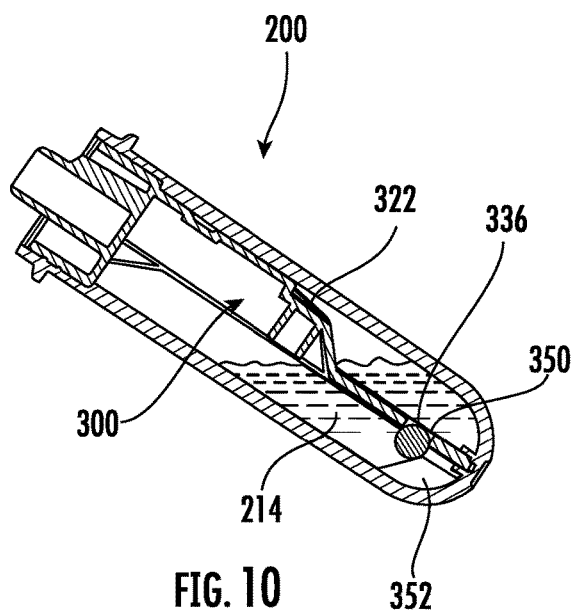

Several dispensing/timing cycle scenarios are illustrated in FIGS. 7-10. FIG. 7 illustrates the normal resting position of the timing device 200. The timing fluid 214 resides within the storage reservoir 330 beneath the main body 302 and the check ball sits in the lower portion thereof due to gravity. FIG. 8 illustrates an interim dispensing angle where product is flowing but the check ball 350 has not yet had time to reach the terminal end of the timing device 200. The check ball 350 does not yet interfere with flow of the timing fluid 214. FIG. 9 illustrates a steeper dispensing angle just past horizontal where the check ball 350 engage the bottom of the angled ramp 352. In this position, the check ball 352 will begin to slow the flow of timing fluid 214 through one of the openings 336 extending the filling time of the timing reservoir 328. Finally, FIG. 10 illustrates a full angled dispensing position where the check ball 350 is able to ride up the full extent of the ramp 352 and seat itself into one of the supply openings 336 fully blocking the opening and restricting flow through only one of the openings 336, further extending the filling time of the timing reservoir 328 and dispensing time of the product. As can now be appreciated, as the volume of product in the container 900 decreases, the time to fill the timing reservoir 328 will gradually lengthen and allow more product to be dispensed.

Figure 6:
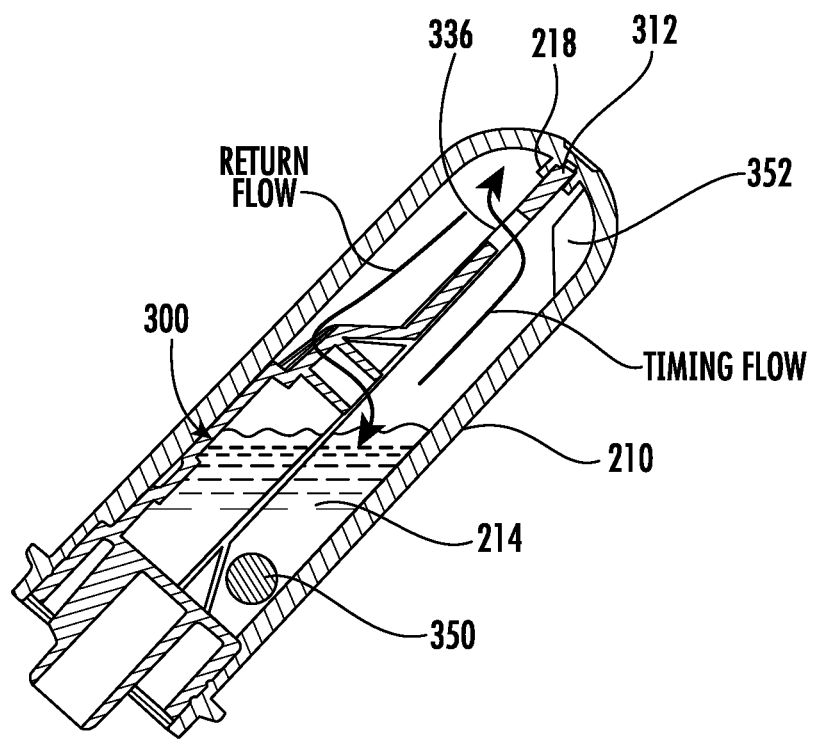
FIG. 6 illustrates a cross-sectional view of the timing device taken along line 6-2 of FIG. 2.

Turing back to FIGS. 6 and 7, when the container 900 is returned to the resting position, the timing fluid 214 flows up and over the angled wall portion 311 and enters into the return channel opening 322 disappearing into the storage reservoir 330.

Another exemplary timing device 400 is illustrated in FIGS. 11-15A. The timing device 400 may include a transparent or translucent outer cylinder 210 as previously described hereinabove, a flow regulator 500 received within the outer cylinder 210 and a flowable material 214, such as a colored fluid received within the outer cylinder 210. In some embodiments, the flowable material 214 may comprise a flowable liquid silicone material.

Flow regulator 500 is similar to the embodiment 300 described hereinabove with the exception of the flow restrictor. The flow regulator 500 includes a generally planar, elongate main body portion 502 and an end cap portion 504. Flow regulator 500 may be inserted into the outer cylinder 210 as noted above where the end cap portion 504 may seal, or close, the end of the outer cylinder 210 into which it is placed. The outer surface of the end cap portion 504 and the inner surface of the outer cylinder 210 may include complementary sealing ribs to prevent leakage and maintain the end cap 504 assembled with the outer cylinder 210. The end cap portion 504 may include a central post 506 and an associated orientation fin 508 extending radially outward from the post 506. More particularly, the orientation fin 508 may be oriented perpendicular to the plane of the main body portion 502, the purpose of which was described above.

The upper portion of the main body 502 of flow regulator 500 may include an upwardly extending curved wall 510 forming a cavity therebeneath. A terminal end portion 512 of the main body 502 is received into a slot 218 at the closed bottom end of the outer cylinder 210 to maintain positioning therein.

Positioning of flow regulator 500 within the outer cylinder 210 may define a timing reservoir 528 and a storage reservoir 530 separated by the main body portion 502 of the flow regulator 500 and defined by the resting angle of the timing device 200. The terminal end portion 512 of the main body 502 defines the timing reservoir 528 in the smaller area above the main body 502 while the storage reservoir 530 is below the main body 502.

Flow regulator 500 may include a return flow opening 522 extending from the timing reservoir 528 into the storage reservoir 528. As noted above, the mounting angle of the timing device 400 at a resting position allows the timing fluid 214 to collect in the storage reservoir 530 below the main body portion 502. In this static resting position, the timing fluid 214 is not visible to the user. In some embodiments, the timing device 400 may further comprise an opaque sleeve (not shown) or other covering or shroud surrounding the area of the storage reservoir 530. The opaque sleeve may shroud the storage reservoir 530 to provide a more aesthetically pleasing presentation of the timing sequence where the user will only see the timing fluid 214 filling the timing reservoir 528.

A fluid supply opening 536 is defined in the flow regulator 500 adjacent the terminal end of the main body 502. The supply opening 536 has a fluid entrance on the lower surface of the main body 302 and an exit on the upper surface leading into the timing reservoir 528. As the container 900 is tipped toward horizontal and beyond (see FIGS. 12-15), fluid in the storage reservoir 530 will flow towards the terminal end 512 of the main body portion 502 and may flow through the supply opening 536 into the timing reservoir 528. Based on the viscosity of the timing fluid 214, the size of the opening 536, and the actual pouring angle, the timing fluid 214 will flow through the opening 536 and gradually fill the timing reservoir 528.

In this regard the, pouring angle of the container 900, the amount of product currently in the container 900, the angle of timing device 400, and the size of the opening 536 all cooperate to coordinate simultaneous flow of the product from the spout 120 with flow of the fluid 214 in the timing device 400 and to thereby to create a defined measurement of product flow from the container 900 correlated with filing of the timing reservoir 528, or partial filling of the timing reservoir 528, at marked indications 240 (see FIG. 2) on the outer cylinder 210.

In order to provide a more consistent product dispensing volume regardless of container volume, the timing device 400 may further include a variable flow restrictor, which in the exemplary embodiment comprises a check ball 550 captured within a multi-finger cage structure 552 on the lower surface of the main body 502 adjacent the fluid supply hole 536. The exemplary embodiment is illustrated with four symmetrical cage fingers 554 arranged to enclose and capture the ball 55 yet allow fluid flow therethrough. Some embodiments of the cage may have more or fewer cage fingers 554 as needed. The check ball 550 is sized proportionally to the fluid supply hole 536, i.e. slightly larger so that the ball 550 may interfere with flow through the opening 536. However, as will be seen in FIGS. 15 and 15A, the ball 550 never actually seats itself into the supply hole 536 even when fully tipped. Referring to FIG. 15A, it can be seen that the cage fingers 554 create a cage structure 552 that is slightly larger than the supply opening 536 whereby the check ball 550 has space to rest below the supply opening 536 when fully tipped. Further, the supply opening 536 is provided with chamfered or angled surfaces 538. When fully tipped, the check ball 550 drops into a resting position between the cage fingers 554 and the lower surface of the body 502, partially blocking fluid flow into the timing reservoir 528 (supply hole 536 remains partially open) and thus slowing the filling of the timing reservoir 528 and extending to pouring cycle.

Figure 15:
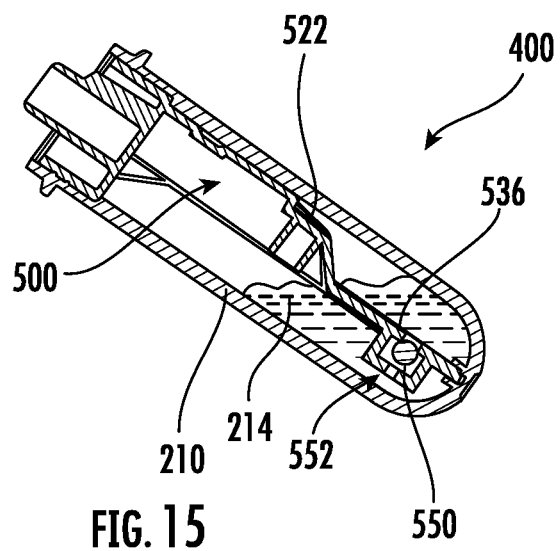
Figure 15A:
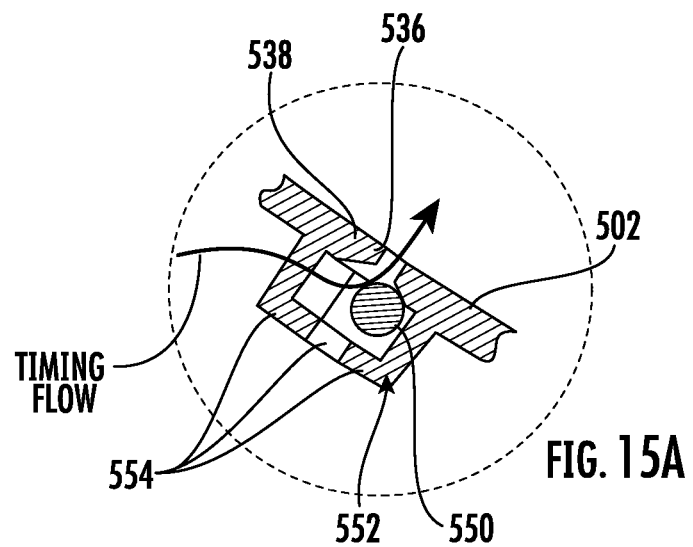
FIG. 15A illustrates an enlarged view of the dashed circled area in FIG. 15.

Several dispensing/timing cycle scenarios are illustrated in FIGS. 12-15. FIG. 12 illustrates the normal resting position of the timing device 400. The timing fluid 214 resides within the storage reservoir 530 beneath the main body 502 and the check ball 550 loosely sits within the cage structure 552. FIG. 13 illustrates an interim dispensing angle where product is flowing but the check ball 550 remains in its neutral position within the cage 552 and does not yet interfere with flow of the timing fluid 214. FIG. 14 illustrates a steeper dispensing angle just past horizontal where the check ball 550 drop towards fingers 354 nearer to the terminal end 512 of the main body 502. In this position, the check ball 352 may begin to slow the flow of timing fluid 214 through the opening 536 extending the filling time of the timing reservoir 528. Finally, FIG. 15 illustrates a full angled dispensing position where the check ball 550 nestles into its resting position as best seen in FIG. 15A, partially blocking the opening and restricting flow through the openings 536, further extending the filling time of the timing reservoir 528 and dispensing time of the product. As can now be appreciated, as the volume of product in the container 900 decreases, the time to fill the timing reservoir 528 will gradually lengthen and allow more product to be dispensed.

Turing back to FIG. 12, when the container 900 is returned to the resting position, the timing fluid 214 flows up and over the angled wall portion 511 and enters into the return channel opening 522 disappearing into the storage reservoir 530.

In other embodiments of the invention, an exemplary timing device may be removably received within a recess formed in the pour cap 110 or directly within the blow molded bottle 900, or more specifically, within a handle thereof.

While various embodiments of the invention have been described with respect to a fluid contained in the timing device, it is understood that other embodiments may utilize other flowable fluids or dry flowable materials, such as powder or granules. In various embodiments, a fluid or flowable material may be colored to offer a contrast to make it easier for a user to visualize the flow in the timing device.

Having thus described certain particular embodiments of the invention, it is understood that the invention defined by the appended claims is not to be limited by particular details set forth in the above description, as many apparent variations thereof are contemplated. Rather, the invention is limited only be the appended claims, which include within their scope all equivalent devices or methods which operate according to the principles of the invention as described.

What is claimed is:

1. A timing device for metering a flowable product dispensed from a dispensing system including a container and a pour cap, the timing device comprising:
   a transparent or translucent outer cylinder;
   a flow regulator within the outer cylinder; and
   a timing fluid contained within the timing device,
   said flow regulator and said outer cylinder defining a storage reservoir and a timing reservoir,
   said flow regulator including at least one supply flow opening between the storage reservoir and the timing reservoir and at least one return flow opening between the timing reservoir and the storage reservoir; and
   a movable flow restrictor which moves to a position adjacent to the supply flow opening to at least partially restrict flow from the storage reservoir into the timing reservoir when the timing device is tilted to a dispensing angle.

2. The timing device of claim 1 wherein the timing device is mounted at an angle between 40° and 70°.

3. The timing device of claim 2 wherein the movable flow restrictor is movable within the storage reservoir.

4. The timing device of claim 2 wherein the storage reservoir is defined beneath the flow regulator and the timing reservoir is defined above the flow regulator.

5. The timing device of claim 4 wherein the storage reservoir is filled with said timing fluid and said timing reservoir is void of said timing fluid when said timing device is at a resting position.

6. The timing device of claim 5 wherein said timing fluid flows from said storage reservoir into said timing reservoir when said timing device is tilted to a pouring angle.

7. The timing device of claim 1 wherein the timing fluid comprises a colored fluid.

8. The timing device of claim 1 further comprising marking indicators visible relative to said timing reservoir.

9. The timing device of claim 8 wherein said marking indicators are on said outer cylinder.

10. The timing device of claim 1 further comprising an opaque sleeve received around a portion of the outer cylinder.

11. The timing device of claim 10 wherein the opaque sleeve is received around the outer cylinder to shroud the storage chamber.

12. The timing device of claim 1 wherein the movable flow restrictor provides a variable flow rate relative to pouring angle.

13. The timing device of claim 1 further comprising a mounting element configured to selectively secure said timing device to a pour cap.

14. The dispensing system of claim 1 wherein said pour cap includes a dispensing spout and a venting tube within the dispensing spout.

15. The dispensing system of claim 14 wherein an upper edge of the venting tube is disposed beneath an upper edge of the dispensing spout.

16. A timing device for metering a flowable product dispensed from a dispensing system including a container and a pour cap, the timing device comprising:
   a transparent or translucent outer cylinder;
   a flow regulator within the outer cylinder; and
   a timing fluid contained within the timing device,
   said flow regulator and said outer cylinder defining a storage reservoir and a timing reservoir,
   said flow regulator including at least one supply flow opening between the storage reservoir and the timing reservoir and at least one return flow opening between the timing reservoir and the storage reservoir,
   said flow regulator further including a flow restrictor adjacent to the supply flow opening to at least partially restrict flow from the storage reservoir into the timing reservoir when the timing device is tilted to a dispensing angle, and wherein the flow restrictor comprises check ball which interacts with the at least one supply flow opening to partially restrict flow.

17. The timing device of claim 16 wherein the at least one supply flow opening comprises two openings and the check ball interacts with one of the supply flow openings to restrict flow.

18. The timing device of claim 16 wherein the flow restrictor further comprises a ramp adjacent to the at least one supply flow opening to guide the check ball toward said at least one supply flow opening.

19. The timing device of claim 16 wherein the flow restrictor further comprises a cage structure capturing the check ball adjacent to the at least one supply flow opening.

20. The timing device of claim 19 wherein a lower surface of said flow regulator is chamfered around said at least one supply flow opening.

\* \* \* \* \*